J. G. McCARREN.
POT FOR USE IN ANNEALING AND CARBONIZING METALS.
APPLICATION FILED FEB. 12, 1919.
1,306,601.
Patented June 10, 1919.
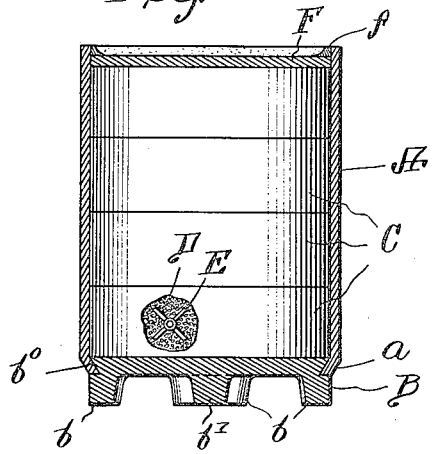
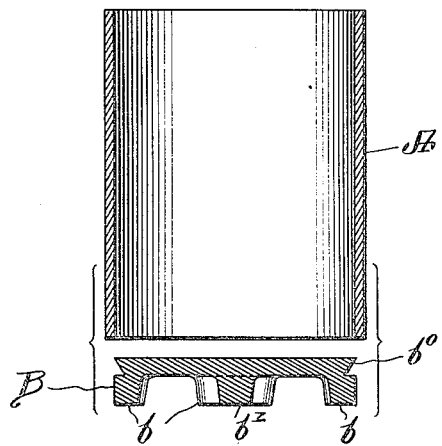
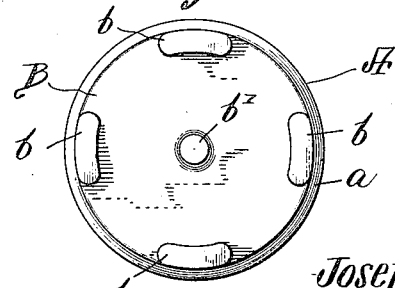
Inventor
Joseph G. McCarren.
by Wilkinson & Giusta,
Attorneys.

UNITED STATES PATENT OFFICE.

JOSEPH G. McCARREN, OF ROCKFORD, ILLINOIS.

POT FOR USE IN ANNEALING AND CARBONIZING METALS.

1,306,601. Specification of Letters Patent. Patented June 10, 1919.

Application filed February 12, 1919. Serial No. 276,655.

*To all whom it may concern:*

Be it known that I, JOSEPH G. MCCARREN, a citizen of the United States, residing at Rockford, in the county of Winnebago and State of Illinois, have invented certain new and useful Improvements in Pots for Use in Annealing and Carbonizing Metals; and I do hereby declare the following to be a full, clear, and exact description of the invention, such as will enable others skilled in the art to which it appertains to make and use the same.

My invention relates to improvements in apparatus for use in annealing and carbonizing metals, and it consists in providing a suitable annealing or carbonizing pot which is durable, not apt to get out of order and which may be cheaply and simply manufactured.

The more general practice is ordinarily to have these pots made with bottoms welded in, and when subjected to the intense heat incident to use, the edges of the weld burn out.

My present invention is intended more especially to provide an improvement over the annealing pot shown in my U. S. Patent No. 1,232,346, granted July 3, 1917.

According to my invention I form the body of the pot of a hollow steel cylinder drawn out as a long tube and cut up into the desired lengths; the lower end of this steel body portion is then spun into a dovetail groove provided in the bottom piece, which is preferably made of cast iron provided with a plurality of supporting and spacing legs, whereby the heating medium attains free access to the bottom as well as the sides of the pot.

After the material to be treated is inserted in the pot, the cover, preferably in the form of a loose fitting disk, is inserted, and the crack between the cover and the inner side wall of the pot is luted in the usual way.

My invention will be more fully understood after reference to the accompanying drawings, in which:

Figure 1 shows a central vertical section through the improved pot with the ordinary carbonizing trays mounted therein, parts being broken away.

Fig. 2 shows a vertical section through the body of the pot and its bottom, before the two are secured together; and Fig. 3 shows an inverted plan view of the pot shown in Fig. 1.

A represents the cylindrical shell, cut out of a long tube, to a suitable length as shown in Fig. 2.

B represents the bottom piece of the pot preferably provided with the downwardly projecting lugs $b$ and $b'$ forming feet for the pot. This bottom piece is provided with a dovetail groove $b^o$ into which the lower end $a$ of the tube A is forced or spun, thus firmly securing the bottom piece to the body portion of the pot.

The carbonizing material D with the articles E being treated may be placed directly in the pot, or they may be inclosed in trays C which are inserted in the pot, as shown in Fig. 1.

After the pot has been filled to the desired height the cover F is put in place and the luting $f$ applied.

By using a cast iron bottom piece with a dovetail groove as described, the steel body portion may be firmly connected to the bottom piece without the use of rivets or any method of welding, thus obviating any trouble from the burning out of the rivets or of the welding, and at the same time a cheap and refractory metal bottom piece is secured.

By having the peripheral legs $b$ the bottom piece is elevated permitting the free circulation of the heating medium beneath the bottom of the pot, and the central leg $b'$ will prevent the bottom from sagging down in the center when highly heated.

Having thus described my invention, what I claim and desire to secure by Letters Patent of the United States is:—

An annealing pot comprising a cylindrical steel shell, and a cast iron bottom piece provided with a dovetail groove into which the lower end of the shell is forced thus firmly connecting the two, the said bottom piece being also provided with downwardly projecting legs serving to hold the bottom of the pot above the supporting platform, and with a central leg serving to prevent the sagging down of the center of the bottom piece when highly heated, substantially as and for the purposes described.

JOSEPH G. McCARREN.